(12) United States Patent
Noda et al.

(10) Patent No.: US 11,504,952 B2
(45) Date of Patent: Nov. 22, 2022

(54) BARRIER MATERIAL

(71) Applicant: NIPPON PAPER INDUSTRIES CO., LTD., Tokyo (JP)

(72) Inventors: Takaharu Noda, Tokyo (JP); Masaaki Fukunaga, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 16/651,287

(22) PCT Filed: Oct. 3, 2018

(86) PCT No.: PCT/JP2018/036968
§ 371 (c)(1),
(2) Date: Mar. 26, 2020

(87) PCT Pub. No.: WO2019/069963
PCT Pub. Date: Apr. 11, 2019

(65) Prior Publication Data
US 2020/0269554 A1  Aug. 27, 2020

(30) Foreign Application Priority Data

Oct. 4, 2017  (JP) .............................. JP2017-194208

(51) Int. Cl.
| | | |
|---|---|---|
| *B32B 27/10* | (2006.01) | |
| *D21H 19/82* | (2006.01) | |
| *B32B 1/02* | (2006.01) | |
| *B32B 27/36* | (2006.01) | |
| *B65D 65/40* | (2006.01) | |
| *D21H 19/40* | (2006.01) | |
| *D21H 19/58* | (2006.01) | |
| *D21H 19/60* | (2006.01) | |
| *D21H 21/16* | (2006.01) | |
| *D21H 27/10* | (2006.01) | |

(52) U.S. Cl.
CPC ................ *B32B 27/10* (2013.01); *B32B 1/02* (2013.01); *B32B 27/36* (2013.01); *B65D 65/40* (2013.01); *D21H 19/40* (2013.01); *D21H 19/58* (2013.01); *D21H 19/60* (2013.01); *D21H 19/822* (2013.01); *D21H 21/16* (2013.01); *D21H 27/10* (2013.01); *B32B 2255/12* (2013.01); *B32B 2255/26* (2013.01); *B32B 2307/7163* (2013.01); *B32B 2307/7244* (2013.01); *B32B 2307/7246* (2013.01); *B32B 2439/46* (2013.01); *B32B 2439/62* (2013.01)

(58) Field of Classification Search
CPC ........... B32B 1/02; B32B 27/10; B32B 27/36; B32B 2255/12; B32B 2255/26; B32B 2307/7163; B32B 2307/7244; B32B 2307/7246; B32B 2439/46; B32B 2439/62; B65D 65/40; D21H 19/40; D21H 19/58; D21H 19/60; D21H 19/822; D21H 21/16; D21H 27/10
See application file for complete search history.

(56) References Cited

U.S. PATENT DOCUMENTS

| | | | | |
|---|---|---|---|---|
| 5,897,411 | A  * | 4/1999 | Stark ..................... | D21H 27/10 |
| | | | | 428/324 |
| 6,306,519 | B1 * | 10/2001 | Sakai ................... | C09D 127/08 |
| | | | | 428/518 |
| 6,821,373 | B1 | 11/2004 | Berlin et al. | |
| 8,029,896 | B2 | 10/2011 | Kumamoto et al. | |
| 2003/0207122 | A1 | 11/2003 | Uchida et al. | |
| 2008/0107847 | A1* | 5/2008 | Yamane ................... | B32B 7/12 |
| | | | | 428/35.7 |
| 2008/0131707 | A1 | 6/2008 | Feeney et al. | |
| 2010/0112226 | A1* | 5/2010 | Weilbacher ............ | D21H 23/48 |
| | | | | 427/372.2 |
| 2010/0215858 | A1 | 8/2010 | Yamane et al. | |
| 2011/0108185 | A1 | 5/2011 | Hokari et al. | |
| 2014/0206798 | A1 | 7/2014 | Oomori et al. | |
| 2016/0040035 | A1 | 2/2016 | Omura et al. | |
| 2018/0304573 | A1 | 10/2018 | Tokunaga et al. | |

FOREIGN PATENT DOCUMENTS

| | | |
|---|---|---|
| CN | 104080607 A | 10/2014 |
| CN | 106585017 A | 4/2017 |
| CN | 107187689 A | 9/2017 |
| EP | 1382643 A1 | 1/2004 |
| EP | 1416087 B1 | 9/2010 |
| JP | H1024518 A | 1/1998 |
| JP | H10259285 A | 9/1998 |
| JP | 2000052520 A | 2/2000 |
| JP | 2002178456 A | 6/2002 |
| JP | 2003094574 A | 4/2003 |
| JP | 2003291296 A | 10/2003 |
| JP | 2005162213 A | 6/2005 |
| JP | 2007076192 A | 3/2007 |
| JP | 2008105709 A | 5/2008 |
| JP | 2009184138 A | 8/2009 |

(Continued)

OTHER PUBLICATIONS

Communication dated Apr. 23, 2021, issued for divisional application (EP20174332.5) of European counterpart patent application No. EP18864106.2 (5 pages).

(Continued)

*Primary Examiner* — Walter Aughenbaugh
(74) *Attorney, Agent, or Firm* — Law Office of Katsuhiro Arai

(57) ABSTRACT

An object is to provide a barrier material which not only is high in degree of biomass and small in amount of $CO_2$ emitted, but also has biodegradability and simultaneously has excellent gas barrier property and water vapor barrier property, and which can be suitably used particularly in packaging applications for foods or the like, such as a packaging material, a bag, a paper container, a cardboard box, and a cup. A solution to be provided is a barrier material having an oxygen permeability of 10 ml/m²·day·atm or less at a temperature of 23° C. and a relative humidity of 0%, and having a total degree of biomass of 50% or more.

18 Claims, No Drawings

(56) References Cited

FOREIGN PATENT DOCUMENTS

| JP | 2010069767 | A  | 4/2010  |
|----|------------|----|---------|
| JP | 4903359    | B2 | 3/2012  |
| JP | 2012192636 | A  | 10/2012 |
| JP | 2013079469 | A  | 5/2013  |
| JP | 5331265    | B1 | 10/2013 |
| JP | 2014009413 | A  | 1/2014  |
| JP | 2017124851 | A  | 7/2017  |
| JP | 2018058360 | A  | 4/2018  |
| WO | 2004035929 | A1 | 4/2004  |
| WO | 2006028000 | A1 | 3/2006  |
| WO | 2006104114 | A1 | 10/2006 |
| WO | 2017069127 | A1 | 4/2017  |

OTHER PUBLICATIONS

W.J. Ward et al.. Gas barrier Improvement using vermiculite and mica in polymer films, Journal of Membrane Science, vol. 55, Jan. 1, 1991, pp. 173-180 (8 pages).
Notification Concerning Transmittal of Copy of International Preliminary Report on Patentability (PCT/IB/326) and Notification of Transmittal of Copies of Translation of the International Preliminary Report on Patentability (PCT/IB/338) dated Apr. 16, 2020, with International Preliminary Report on Patentability (PCT/IB/373) and Written Opinion of the International Searching Authority (PCT/ISA/237), for corresponding international application PCT/JP2018/036968 (36 pages).
Extended European Search Report (EESR) dated Sep. 1, 2020, issued for divisional application (EP20174332.5) of European counterpart patent application No. EP18864106.2 (7 pages).
International Search Report (ISR) dated Dec. 25, 2018, issued for International application No. PCT/JP2018/036968. (3 pages).
Blanchard et al., Effect of humidity on mechanical, thermal and barrier properties of EVOH films, Journal of Membrane Science, vol. 540, Jun. 15, 2017 (Jun. 15, 2017), pp. 1-9 (9 pages).
Extended European Search Report (EESR) dated Jun. 7, 2021, issued for European counterpart patent application No. EP18864106.2 (9 pages).
A First Office Action issued by the State Intellectual Property Office of China dated Oct. 19, 2021, for Chinese counterpart application No. 201880063538.3 (7 pages).
An Examination Report Under Sections 12 & 13 of the Patents Act, 1970 and the Patents Rules, 2003, issued by Government of India, Intellectual Property India, dated Oct. 25, 2021 for Indian counterpart application No. 202017015252 (7 pages).
A Second Office Action issued by the State Intellectual Property Office of China dated Aug. 17, 2022, for Chinese counterpart application No. 201880063538.3 (9 pages).
Recycling of polymer materials, Huang Farong et.al, pp. 78-80, Chemical Industry Press Co., Ltd., Jan. 31, 2000 (5 pages).

* cited by examiner

BARRIER MATERIAL

CROSS-REFERENCE TO RELATED APPLICATIONS

This application is the U.S. National Phase under 35 U.S.C. § 371 of International Application PCT/JP2018/036968, filed Oct. 3, 2018, which claims priority to Japanese Patent Application No. JP2017-194208, filed Oct. 4, 2017. The International Application was published under PCT Article 21(2) in a language other than English.

TECHNICAL FIELD

The present invention relates to a barrier material which not only is high in degree of biomass and small in amount of $CO_2$ emitted, but also has biodegradability and simultaneously has excellent gas barrier property and water vapor barrier property, and which can be suitably used particularly in packaging applications for foods or the like, such as a packaging material, a bag, a paper container, a cardboard box, and a cup.

BACKGROUND ART

It is important to impart a gas barrier property (in particular, oxygen barrier property) to a paper material, in particular, a paper packaging material for the purpose of protecting various products to be packaged, from degradation due to gas, for example, oxidation due to oxygen.

There has been conventionally mainly used a method for imparting gas barrier property to a paper packaging material, which includes extrusion lamination or pasting of, for example, metal foil or a metal deposition film made of a metal such as aluminum, a resin film made of polyvinyl alcohol, an ethylene-vinyl alcohol copolymer, polyvinylidene chloride, polyacrylonitrile, or the like, a film coated with such a resin, or a ceramic deposition film on which an inorganic oxide such as silicon oxide or aluminum oxide is deposited, as a gas barrier layer onto a paper base material.

There have been disclosed paper packaging materials other than the above, to which gas barrier property is imparted, for example, a paper gas barrier material which has a gas barrier layer made of a water-soluble polymer and an inorganic layered compound (Patent Literatures 1 and 2) and a paper gas barrier material where a barrier layer made of a specific vinyl alcohol-based polymer is disposed on a covering layer (Patent Literatures 2 and 3).

It is also important to impart moistureproofness (water vapor barrier property) to a paper packaging material for the purpose of protecting various products to be packaged, from degradation due to moisture (water vapor).

There has been mainly used a method for imparting water vapor barrier property to a paper packaging material, which includes extrusion lamination or pasting of, for example, a resin film excellent in water vapor barrier property or a film coated with such a resin excellent in water vapor barrier property, onto a paper base material.

There has been disclosed packaging paper which has a moistureproof layer composed of a synthetic resin latex, a wax and inorganic fine particles (Patent Literature 4), as a paper packaging material to which water vapor barrier property is imparted by a method other than the above method.

Furthermore, there is known a packaging material in which a resin having gas barrier property and a resin having water vapor barrier property are laminated on a paper base material, as a packaging material where both gas barrier property and water vapor barrier property are imparted to a paper packaging material.

In recent years, there has been a movement of decrease in emission of greenhouse gases for the prevention of global warming, and there has been a search for the change in raw material of a packaging material from a petroleum-derived raw material to a bio-derived raw material. In addition, packaging waste issues have gained prominent attention in the world. For example, a problem caused in Europe, Asia, etc., is that waste may be discarded with being buried in the soil or piled in an open field without any incineration disposal and thus a petroleum-derived component in a packaging material is not degraded in nature, but transformed into microplastics, and flows out through rivers to the ocean due to rain or the like to cause ocean pollution. In view of such circumstances, there is a need for a packaging material which is to be degraded in the environment. That is, there is a need for a packaging material which is not a petroleum-derived packaging material, but a bio-derived (biomass-derived) packaging material further having biodegradability.

A paper packaging material having gas barrier property includes paper where pulp as a main component is a bio-derived material. Such a material, however, includes resins used in a barrier film, a laminate layer and the like, in addition to such paper, the resins being mostly petroleum-derived resins.

In recent years, a packaging material having barrier property, in which a bio-derived material is used in other components than paper, has been proposed for a reduction in load to the environment, and, for example, Patent Literature 5 has proposed a layered packaging material for foods, the material including a paper core layer, a barrier layer and a thermoplastic resin layer, wherein the thermoplastic resin layer includes plastic made of a plant raw material.

CITATION LIST

Patent Literatures

[Patent Literature 1] Japanese Patent Laid-Open No. 2009-184138
[Patent Literature 2] Japanese Patent Laid-Open No. 2003-094574
[Patent Literature 3] Japanese Patent No. 5331265
[Patent Literature 4] Japanese Patent Laid-Open No. 2005-162213
[Patent Literature 5] Japanese Patent Laid-Open No. 2008-105709

DISCLOSURE OF THE INVENTION

Technical Problem

A packaging material in which a resin having gas barrier property and a resin having water vapor barrier property are laminated or pasted on a paper base material is, however, restricted in terms of, for example, the type of a resin which can be laminated, and thus has the problem of being incapable of coping with various required qualities.

On the other hand, a packaging material to which gas barrier property and water vapor barrier property are imparted by coating a paper base material with a resin having gas barrier property and a resin having water vapor barrier property is less restricted in terms of, for example, the type of a resin which can be used, and thus can cope with various required qualities. In the case, however, where the moistureproof layer in Patent Literature 4 is disposed on a packaging material to which both gas barrier property and water vapor barrier property are imparted, for example, the packaging material having gas barrier property in Patent Literature 1 or Patent Literature 2, a problem is that no gas barrier property can be obtained while favorable water vapor barrier property is obtained. Also in the case where the gas barrier layer in Patent Literature 1 or Patent Literature 2 is disposed on the moistureproof paper having a water vapor barrier layer in Patent Literature 4, sufficient gas barrier property and water vapor barrier property cannot be simultaneously obtained.

There has been conventionally only a petroleum-derived resin, as a material having barrier property. Thus, a barrier material high in degree of biomass has been produced by, for example, layering a petroleum-derived resin having gas barrier property or a petroleum-derived resin having water vapor barrier property on a bio-derived paper base material, according to extrusion lamination or dry lamination.

If, however, the resin used is a petroleum-derived resin, a problem is that not only there are limitations on an enhancement in degree of biomass and a decrease in amount of $CO_2$ emitted, but also a resin portion is not degraded and remains in the environment.

Accordingly, an object of the present invention is to provide a barrier material which not only is high in degree of biomass and small in amount of $CO_2$ emitted, but also has biodegradability and simultaneously has excellent gas barrier property and water vapor barrier property, and which can be suitably used particularly in packaging applications for foods or the like, such as a packaging material, a bag, a paper container, a cardboard box, and a cup.

Solution to Problem

The present invention provides the following [1] to [22].
[1] A barrier material having an oxygen permeability of 10 $ml/m^2 \cdot day \cdot atm$ or less at a temperature of 23° C. and a relative humidity of 0%, and having a total degree of biomass of 50% or more.
[2] The barrier material according to [1], wherein the barrier material has a resin layer on at least one surface of a base material, the resin layer containing a biodegradable resin as a main component.
[3] The barrier material according to [2], wherein the biodegradable resin is polylactic acid or polybutylene succinate.
[4] The barrier material according to [1], wherein the barrier material has a resin layer on at least one surface of a base material, the resin layer containing a bio-derived resin as a main component.
[5] The barrier material according to [1], wherein the barrier material has a resin layer as a coating layer on at least one surface of a base material.
[6] The barrier material according to [1], wherein the barrier material contains mica.
[7] The barrier material according to any of [2] to [6], wherein the base material is a paper base material.
[8] The barrier material according to [7], wherein the paper base material has a gas barrier layer on a paper substrate.
[9] The barrier material according to [7] or [8], wherein the paper base material has a water vapor barrier layer and a gas barrier layer in this order, on a paper substrate.
[10] The barrier material according to any of [1] to [9], having a water vapor permeability of 100 $g/m^2 \cdot day$ or less at a temperature of 40±0.5° C. and a relative humidity difference of 90±2%.
[11] The barrier material according to any of [1] to [10], having a water vapor permeability of 10 $g/m^2 \cdot day$ or less at a temperature of 40±0.5° C. and a relative humidity difference of 90±2%.
[12] The barrier material according to any of [1] to [11], meeting the conditions in (1) to (3) of:
(1) a water vapor permeability of 3.5 $g/m^2 \cdot day$ or less at a temperature of 40±0.5° C. and a relative humidity difference of 90±2%,
(2) an oxygen permeability of 3 $ml/m^2 \cdot day \cdot atm$ or less at a temperature of 23° C. and a relative humidity of 0%, and
(3) an oxygen permeability of 3 $ml/m^2 \cdot day \cdot atm$ or less at a temperature of 23° C. and a relative humidity of 85%.
[13] The barrier material according to [8] or [9], wherein the gas barrier layer contains a water-soluble polymer and a surfactant.
[14] The barrier material according to [9], wherein the water vapor barrier layer contains a water vapor barriering resin and a water repellent.
[15] The barrier material according to [9], wherein the water vapor barrier layer contains a water vapor barriering resin and a water repellent, and the gas barrier layer contains a water-soluble polymer and a surfactant.
[16] The barrier material according to any of [7] to [15], wherein the paper base material has a grammage of 30 $g/m^2$ or more and 150 $g/m^2$ or less.
[17] A packaging material using the barrier material according to any of [1] to [16].
[18] A bag using the barrier material according to any of [1] to [16].
[19] A paper container using the barrier material according to any of [1] to [16].
[20] A cardboard box using the barrier material according to any of [1] to [16].
[21] A cup using the barrier material according to any of [1] to [16].
[22] A soft packaging material using the barrier material according to any of [1] to [16].

Advantageous Effects of Invention

The present invention can provide a barrier material simultaneously having excellent gas barrier property and water vapor barrier property. Furthermore, the barrier material of the present invention not only is high in degree of biomass and thus can allow the amount of $CO_2$ emitted between production and disposal to be reduced particularly in use for a packaging material and can contribute to prevention of global warming, but also can be degraded in the environment because of imparting of biodegradability and thus can prevent microplastics from remaining. The barrier material is also high in ratio of a renewable material in a raw material, and can allow for continuous utilization of resources.

DESCRIPTION OF EMBODIMENTS

The present invention relates to a barrier material having an oxygen permeability of 10 $ml/m^2 \cdot day \cdot atm$ or less at a temperature of 23° C. and a relative humidity of 0%, and having a total degree of biomass of 50% or more.

In the present invention, the "degree of biomass" serves as an index representing the mixing ratio of a petroleum-derived raw material and a bio-derived (biomass-derived) raw material, is determined by the weight ratio of the bio-derived raw material in the barrier material, and is expressed by the following formula.

Degree of biomass (%)=Dry weight(g) of bio-derived raw material/Dry weight(g) of barrier material×100

The barrier material of the present invention preferably has a degree of biomass of 70% or more, more preferably 75% or more, further preferably 80% or more, still more preferably 85% or more, particularly preferably 90% or more.

Furthermore, the barrier material of the present invention can have a water vapor permeability of 100 g/m²·day or less at a temperature of 40±0.5° C. and a relative humidity difference of 90±2%. The water vapor permeability is preferably 30 g/m²·day or less, more preferably 10 g/m²·day or less, further preferably 3.5 g/m²·day or less.

In addition, the barrier material of the present invention can have an oxygen permeability of 5 ml/m²·day·atm or less at a temperature of 23° C. and a relative humidity of 0%. The oxygen permeability under such drying is preferably 3 ml/m²·day·atm or less, more preferably 1.5 ml/m²·day·atm or less.

The barrier material of the present invention can also have an oxygen permeability of 50 ml/m²·day·atm or less at a temperature of 23° C. and a relative humidity of 85%. The oxygen permeability under such a high humidity is preferably 30 ml/m²·day·atm or less, more preferably 3 ml/m²·day·atm or less.

The barrier material of the present invention preferably has a resin layer containing a biodegradable resin as a main component, on at least one surface of a base material. The base material which can be suitably used is a film including a bio-derived resin, or a paper base material, in order to increase the degree of biomass of the entire barrier material. The barrier material of the present invention preferably includes a paper base material being paper barrier base paper having a gas barrier layer on a paper substrate, more preferably a paper base material being paper barrier base paper having a water vapor barrier layer and a gas barrier layer on a paper substrate, further preferably a paper base material being paper barrier base paper having a water vapor barrier layer and a gas barrier layer in this order, on a paper substrate, in order to exhibit a high barrier property. The resin layer can be disposed on both surfaces of the paper barrier base paper, and is preferably provided on at least a water vapor barrier layer or a gas barrier layer in order that any effect on (degradation of) such barrier layers due to moisture in the air is prevented.

The reason why the paper barrier base paper having a water vapor barrier layer and a gas barrier layer on a paper substrate, in particular, the paper barrier base paper having a water vapor barrier layer and a gas barrier layer in this order simultaneously has excellent water vapor barrier property and gas barrier property is presumed as follows.

A resin having gas barrier property, for use in a gas barrier layer, is generally a water-soluble polymer or a water-dispersible resin (hereinafter, sometimes collectively referred to as "aqueous resin".) as exemplified below, and, in the case where a gas barrier layer and a water vapor barrier layer are disposed in this order, on a paper substrate, a gas barrier layer containing an aqueous resin is easily degraded due to moisture in the paper substrate, and/or moisture in the air, which penetrates through the paper substrate. On the other hand, a water vapor barrier layer and a gas barrier layer each containing a resin favorable in waterproofness can be included in this order, on a paper substrate, thereby allowing the water vapor barrier layer to effectively suppress any effect of moisture in the paper substrate on (degradation of) the gas barrier layer. Thus, in particular, the paper barrier base paper having a water vapor barrier layer and a gas barrier layer in this order has favorable water vapor barrier property and gas barrier property.

The barrier material of the present invention specifically preferably meets the following conditions of:
(1) a water vapor permeability of 3.5 g/m²·day or less at a temperature of 40±0.5° C. and a relative humidity difference of 90±2%;
(2) an oxygen permeability of 3 ml/m²·day·atm or less at a temperature of 23° C. and a relative humidity of 0%; and
(3) an oxygen permeability of 3 ml/m²·day·atm or less at a temperature of 23° C. and a relative humidity of 85%;
more preferably meets the following conditions of:
(1-2) a water vapor permeability of 2 g/m²·day or less at a temperature of 40±0.5° C. and a relative humidity difference of 90±2%;
(2-2) an oxygen permeability of 2 ml/m²·day·atm or less at a temperature of 23° C. and a relative humidity of 0%; and
(3-2) an oxygen permeability of 2 ml/m²·day·atm or less at a temperature of 23° C. and a relative humidity of 85%.

(Base Material)

The base material which can be suitably utilized is a film including a bio-derived resin, or a paper base material, in order to increase the degree of biomass of the barrier material. In the present invention, a paper base material is preferable.

The bio-derived resin refers to a polymer material which includes an organic resource-derived substance renewable as a raw material, which is obtained by chemical or biological synthesis, and which has a number average molecular weight (Mn) of 1,000 or more.

Such an organic resource encompasses living plants and animals, harvested farm and marine products/forest products, organism remains, and the like, and specific examples thereof include the following.

Waste organic resources: food wastes, domestic animal wastes, building waste materials, used paper, and the like.

Unutilized organic resources: non-edible portions of agricultural crops, forest land-remaining materials, and the like.

Energy grain-based organic resources: plants to be cultivated for the purpose of energy sources or raw materials of products.

New crop-based organic resources: marine plants and genetically engineered plants suitable for organic resource production.

Specific examples of such a bio-derived resin include polylactic acid (PLA), polyglycolic acid, esterified starch, cellulose acetate, polybutylene succinate (PBS), polybutylene succinate adipate (PBSA), polyester (PTT) of propanediol obtained by a fermentation method and fossil resource-derived terephthalic acid, soybean polyol, polyhydroxyalkanoate, biopolyethylene, biopolyethylene terephthalate, biopolyurethane and the like.

(Paper Base Material)

In the present invention, the paper base material means a sheet (hereinafter, also referred to as "paper substrate".) mainly containing pulp, and can have any of or both a water vapor barrier layer and a gas barrier layer on the sheet (paper substrate).

Examples of the pulp which can be used include chemical pulp such as hardwood bleached kraft pulp (LBKP), softwood bleached kraft pulp (NBKP), hardwood unbleached kraft pulp (LUKP), softwood unbleached pulp (NUKP) and sulfite pulp, mechanical pulp such as stone ground wood pulp and thermomechanical pulp, wood fibers such as de-inked pulp and recycled paper pulp, and non-wood fibers obtained from kenaf, bamboo, hemp, and the like, and these can be appropriately blended and used. In particular, chemical pulp in the form of a wood fiber, or mechanical pulp is preferably used and chemical pulp is more preferably used for the reasons that, for example, contamination hardly occurs in the paper substrate, discoloration over time hardly occurs in recycling and use of a used barrier material as a raw material of used paper, and a high degree of whiteness allows surface touch in printing to be favorable, resulting in an enhancement in utility value particularly in use as a packaging material.

A filler and/or various auxiliary agents can be added to the paper substrate in the present invention. The filler which can be here used is, for example, a known filler such as white carbon, talc, kaolin, clay, ground calcium carbonate, precipitated calcium carbonate, titanium oxide, zeolite or a synthetic resin filler. A papermaking internal auxiliary agent, for example, aluminum sulfate, and various anionic, cationic, nonionic or amphoteric retention aids, drainage aids, paper strengthening agents and internal sizing agents can be, if necessary, used. Furthermore, a dye, a fluorescent whitening agent, a pH adjuster, an antifoaming agent, a pitch control agent, a slime control agent, and the like can also be, if necessary, added.

The production (papermaking) method of the paper substrate is not limited in any way, and the paper substrate can be produced by papermaking with a known fourdrinier former, on-top hybrid former, gap former machine, or the like according to an acidic papermaking, neutral papermaking or alkaline papermaking method. The paper substrate may be configured from one layer or multiple layers including two or more layers.

The surface of the paper substrate can be treated with various chemical agents. Examples of such chemical agents to be used can include oxidized starch, hydroxyethyl etherified starch, enzyme-modified starch, polyacrylamide, polyvinyl alcohol, a surface sizing agent, a water-resistant agent, a water-retention agent, a thickening agent and a lubricant, and such chemical agents can be used alone or as a mixture of two or more kinds thereof. Furthermore, such various chemical agents may be used in combination with a pigment. Examples of the pigment include inorganic pigments such as kaolin, clay, engineered kaolin, delaminated clay, ground calcium carbonate, precipitated calcium carbonate, mica, talc, titanium dioxide, barium sulfate, calcium sulfate, zinc oxide, silicate, silicate salt, colloidal silica and satin white, and solid, hollow or core-shell type organic pigments, and such pigments can be used alone or as a mixture of two or more kinds thereof.

The method of treating the surface of the paper substrate is not limited in any way, and a known coating machine such as a rod metering size press, a pond type size press, a gate roll coater, a spray coater, a blade coater or a curtain coater can be used.

Examples of the paper substrate thus obtained can include various known substrates such as high-quality paper, medium-quality paper, coated paper, one-side glazed paper, kraft paper, one-side glazed kraft paper, bleached kraft paper, glassine paper, paperboard, white paperboard and a liner.

The paper substrate usually preferably has a grammage of about 20 g/m$^2$ or more and 600 g/m$^2$ or less, while such a grammage can be appropriately selected depending on various qualities, handleability and the like desired for the barrier material. The packaging material, when used as a packaging material for foods or the like or used in a packaging application such as a bag, a paper container, a cardboard box or a cup, more preferably has a grammage of 25 g/m$^2$ or more and 600 g/m$^2$ or less.

Furthermore, the packaging material particularly preferably has a grammage of 30 g/m$^2$ or more and 150 g/m$^2$ or less when used for a bag or a soft packaging material described below, 170 g/m$^2$ or more and 600 g/m$^2$ or less when used for a paper container, when used for cardboard, 150 g/m$^2$ or more and 300 g/m$^2$ or less when used for a liner, and 120 g/m$^2$ or more and 200 g/m$^2$ or less when used for a corrugating medium.

It is possible for a more enhancement in barrier property in the present invention to use paper barrier base paper having a gas barrier layer on the paper substrate, as the paper base material. In the case where higher barrier property is required, paper barrier base paper having a water vapor barrier layer and a gas barrier layer on the paper substrate, or paper barrier base paper having a water vapor barrier layer and a gas barrier layer in this order on the paper substrate can be used as the paper base material. The water vapor barrier layer and the gas barrier layer can be formed on the base material by coating with an aqueous coating color containing mainly water as a solvent.

(Water Vapor Barrier Layer)

In the present invention, examples of a water vapor barriering resin for use in the water vapor barrier layer include various copolymers such as styrene-butadiene-based, styrene-acrylic, ethylene-vinyl acetate-based, paraffin (WAX)-based, butadiene-methyl methacrylate-based, and vinyl acetate-butyl acrylate-based copolymers, synthetic adhesives such as a maleic anhydride copolymer, an acrylic acid-methyl methacrylate-based copolymer, and such synthetic adhesives to which paraffin (WAX) is blended, and these can be used alone or as a mixture of two or more kinds thereof. In particular, a styrene-butadiene-based synthetic adhesive is preferably used among them from the viewpoint of water vapor barrier property.

The styrene-butadiene-based synthetic adhesive in the present invention is a resin obtained by emulsion polymerization of a combination of styrene and butadiene used as main constituent monomers with various comonomers for the purpose of modification. Examples of such comonomers include methyl methacrylate, acrylonitrile, acrylamide, hydroxyethyl acrylate, and unsaturated carboxylic acids such as itaconic acid, maleic acid and acrylic acid. As an emulsifier, for example, an anionic surfactant such as sodium oleate, rosin acid soap, sodium alkyl allyl sulfonate or sodium dialkyl sulfosuccinate can be used alone or in combinations with a nonionic surfactant. An amphoteric or cationic surfactant may be used depending on the object.

As long as no problems about water vapor barrier property are caused, a water-soluble polymer, for example, polyvinyl alcohols such as completely saponified polyvinyl alcohol, partially saponified polyvinyl alcohol and ethylene copolymerized polyvinyl alcohol, proteins such as casein, soy protein and synthetic protein, starches such as oxidized starch, cationized starch, starch urea phosphate and hydroxyethyl etherified starch, cellulose derivatives such as carboxymethyl cellulose, hydroxymethyl cellulose and hydroxyethyl cellulose, polyvinylpyrrolidone, and sodium alginate, and/or a water-dispersible resin, for example, polyvinylidene chloride and a modified polyolefin-based resin can also be used in combination with the water vapor barriering resin.

In the present invention, the water vapor barrier layer preferably contains a pigment from the viewpoint of adhesion of the water vapor barrier layer to a gas barrier layer in a configuration having the water vapor barrier layer and the gas barrier layer.

Examples of the pigment include inorganic pigments such as kaolin, clay, engineered kaolin, delaminated clay, ground calcium carbonate, precipitated calcium carbonate, mica, talc, titanium dioxide, barium sulfate, calcium sulfate, zinc oxide, silicate, silicate salt, colloidal silica and satin white, and solid, hollow or core-shell type organic pigments, and such pigments can be used alone or as a mixture of two or more kinds thereof.

Among such pigments, inorganic pigments such as flat-shaped kaolin, mica and talc are preferable, and kaolin and mica are more preferable from both viewpoints of an enhancement in water vapor barrier property and suppression of permeation into a gas barrier layer. An inorganic pigment having a volume average particle size at 50% (D50) (hereinafter, also referred to as "average particle size".) of 5 µm or more and an aspect ratio of 10 or more is preferably used alone or as a mixture of two or more kinds thereof. If an inorganic pigment to be used has a smaller average particle size or an aspect ratio than the above range, the number of times of going around of water vapor in the water vapor barrier layer may be decreased to reduce the distance of movement, which may result in a decrease in effect of improving a water vapor barrier property.

In the present invention, a water vapor barrier layer containing an inorganic pigment having an average particle size of 5 µm or more and an aspect ratio of 10 or more may further contain a pigment having an average particle size of 5 µm or less from the viewpoints of an enhancement in water vapor barrier property and adhesion to a gas barrier layer. Such a pigment having an average particle size of 5 µm or less can be used in combination to thereby decrease voids in the water vapor barrier layer, formed by the inorganic pigment having an average particle size of 5 µm or more and an aspect ratio of 10 or more, and thus more excellent water vapor barrier property is exhibited. In other words, it is presumed that the water vapor barrier layer, when contains pigments different in average particle size from each other, is in the state where voids in the water vapor barrier layer, formed by an inorganic pigment having a larger average particle size, are filled with a pigment having a smaller average particle size to allow water vapor to pass through by going around the pigment, and thus has high water vapor barrier property as compared with a water vapor barrier layer not containing any pigment different in average particle size.

In the present invention, in the case where the inorganic pigment having an average particle size of 5 µm or more and an aspect ratio of 10 or more and the pigment having an average particle size of 5 µm or less are used in combination, the blending ratio of the inorganic pigment having an average particle size of 5 µm or more and an aspect ratio of 10 or more and the pigment having an average particle size of 5 µm or less is preferably 50/50 to 99/1 in terms of dry weight. A lower blending ratio of the inorganic pigment having an average particle size of 5 µm or more and an aspect ratio of 10 or more, than the above range, may decrease the number of times of going around of water vapor in the water vapor barrier layer and shorten the distance of movement thereof, causing the effect of improving water vapor barrier property to be reduced. On the other hand, a higher ratio than the above range cannot allow voids in the water vapor barrier layer, formed by the inorganic pigment having a larger average particle size, to be sufficiently filled with the pigment having an average particle size of 5 µm or less, and cannot allow a further enhancement in water vapor barrier property to be observed.

In the present invention, examples of the pigment having an average particle size of 5 µm or less, which can be used in combination with the inorganic pigment having an average particle size of 5 µm or more and an aspect ratio of 10 or more, include inorganic pigments such as kaolin, clay, engineered kaolin, delaminated clay, ground calcium carbonate, precipitated calcium carbonate, mica, talc, titanium dioxide, barium sulfate, calcium sulfate, zinc oxide, silicate, silicate salt, colloidal silica and satin white, and solid, hollow or core-shell type organic pigments, and such pigments can be used alone or as a mixture of two or more kinds thereof. Among such pigments, ground calcium carbonate is preferably used.

In the case where the water vapor barrier layer contains such a pigment, the blending quantity of the pigment is preferably in the range of 50 parts by weight or more and 2000 parts by weight or less, more preferably 65 parts by weight or more and 1000 parts by weight or less in terms of dry weight based on 100 parts by weight of the total quantity of the water vapor barriering resin and the water-soluble polymer.

Various auxiliary agents commonly used, such as a dispersant, a thickening agent, a water-retention agent, an antifoaming agent, a water-resistant agent, a dye and a fluorescent dye can be used, in addition to the above water vapor barriering resin, water-soluble polymer and pigment, in the water vapor barrier layer.

In the present invention, a crosslinking agent typified by a polyvalent metal salt or the like can be added to the water vapor barrier layer. The crosslinking agent allows a crosslinking reaction with an aqueous resin contained in the water vapor barrier layer to occur, resulting in an increase in number of bonds (crosslinked points) in the water vapor barrier layer. In other words, the water vapor barrier layer can have a dense structure to thereby exhibit favorable water vapor barrier property.

In the present invention, the type of the crosslinking agent is not limited in any way, and a polyvalent metal salt (a compound obtained by bonding a multivalent metal such as copper, zinc, silver, iron, potassium, sodium, zirconium, aluminum, calcium, barium, magnesium or titanium and an ionic substance such as carbonate ion, sulfate ion, nitrate ion, phosphate ion, silicate ion, nitrogen oxide or boron oxide), an amine compound, an amide compound, an aldehyde compound, hydroxyl acid, and the like can be appropriately selected and used depending on the types of the water vapor barriering resin and the water-soluble polymer contained in the water vapor barrier layer.

In the case of use of a styrene-based water vapor barriering resin exhibiting an excellent effect on water vapor barrier property, such as a styrene-butadiene-based or styrene-acrylic resin, the polyvalent metal salt is preferably used and potassium alum is more preferably used from the viewpoint of expression of the crosslinking effect.

The blending quantity of the crosslinking agent is not limited in any way as long as the mixing amount of the crosslinking agent allows the concentration and the viscosity of the coating color to fall within ranges permitting coating operation, the blending quantity of the crosslinking agent to be used is preferably in the range of 0.5 parts by weight or more and 30 parts by weight or less, more preferably in the range of 1 part by weight or more and 15 parts by weight or less in terms of dry weight based on 100 parts by weight of the total quantity of the water vapor barriering resin and the water-soluble polymer. A blending quantity of less than 0.5 parts by weight may cause the effect of addition of the crosslinking agent not to be sufficiently obtained in some cases. On the other hand, a blending quantity of more than 30 parts by weight may cause the viscosity of a coating color to be remarkably increased, thereby making coating difficult in some cases.

In the present invention, in the case where the crosslinking agent is added to a coating color for the water vapor barrier layer, the crosslinking agent is preferably dissolved in a polar solvent such as ammonia and then added to the coating color. The crosslinking agent is dissolved in the polar solvent to form a bond together with the polar solvent, thereby allowing a crosslinking reaction with the water vapor barriering resin or the water-soluble polymer not to immediately occur even if added to the coating color, and thus inhibiting the coating color from being thickened. In such a case, it is presumed that the paper base material is coated and then dried to thereby volatilize a polar solvent component, thereby allowing a crosslinking reaction with the water vapor barriering resin or the water-soluble polymer to occur to form a dense water vapor barrier layer, resulting in an enhancement in water vapor barrier property.

In the present invention, the water vapor barrier layer preferably contains a water repellent from the viewpoint of an enhancement in water vapor barrier property. Examples of the water repellent can include a paraffin-based water repellent mainly containing an alkane compound, a natural fat-based water repellent derived from an animal or plant, such as carnauba wax or lanolin, a silicone-containing water repellent containing silicone or a silicone compound, and a fluorine-containing water repellent containing a fluorine compound. In particular, a paraffin-based water repellent is preferably used from the viewpoint of expression of water vapor barrier performance. Such water repellent can be used alone or as a mixture of two or more kinds thereof.

In the present invention, the blending quantity of the water repellent is not limited in any way, and the blending quantity of the water repellent is preferably 1 part by weight or more and 100 parts by weight or less in terms of dry weight based on 100 parts by weight of the total quantity of the water vapor barriering resin and the water-soluble polymer. A blending quantity of the water repellent of less than 1 part by weight can cause the effect of enhancing water vapor barrier property not to be sufficiently obtained. On the other hand, a blending quantity of the water repellent of more than 100 parts by weight can cause gas barrier property to be deteriorated because the gas barrier layer is difficult to uniformly form in the case of providing of the gas barrier layer on the water vapor barrier layer.

In the present invention, the wetting tension on the surface of the water vapor barrier layer is preferably 10 mN/m or more and 60 mN/m or less, more preferably 15 mN/m or more and 50 mN/m or less from the viewpoints of an enhancement in water vapor barrier property and adhesion to the gas barrier layer.

A coating color for the water vapor barrier layer preferably contains water as a main solvent.

(Gas Barrier Layer)

In the present invention, examples of the water-soluble polymer for use in the gas barrier layer can include polyvinyl alcohols such as completely saponified polyvinyl alcohol, partially saponified polyvinyl alcohol and ethylene copolymerized polyvinyl alcohol, proteins such as casein, soy protein and synthetic protein, starches such as oxidized starch, cationized starch, starch urea phosphate and hydroxyethyl etherified starch, cellulose derivatives such as carboxymethyl cellulose, hydroxymethyl cellulose and hydroxyethyl cellulose, polyvinylpyrrolidone, and sodium alginate. In particular, polyvinyl alcohols and cellulose derivatives are preferable and polyvinyl alcohols are further preferable from the viewpoint of gas barrier property. Examples of the water-dispersible resin include polyvinylidene chloride and a modified polyolefin-based resin.

In the present invention, the gas barrier layer preferably contains a pigment from the viewpoint of an enhancement in gas barrier property. Examples of the pigment for use in the gas barrier layer include inorganic pigments such as kaolin, clay, engineered kaolin, delaminated clay, ground calcium carbonate, precipitated calcium carbonate, mica, talc, titanium dioxide, barium sulfate, calcium sulfate, zinc oxide, silicate, silicate salt, colloidal silica and satin white, and solid, hollow or core-shell type organic pigments, and such pigments can be used alone or as a mixture of two or more kinds thereof.

In particular, an inorganic pigment is preferably used, an inorganic pigment having an average particle size of 3 μm or more and an aspect ratio of 10 or more is more preferably used, and an inorganic pigment having an average particle size of 5 μm or more and an aspect ratio of 30 or more is further preferably used, from the viewpoint of gas barrier property. Such an inorganic pigment is particularly preferably kaolin or mica.

In the case where the gas barrier layer contains such a pigment, a gas such as oxygen passes through by going around the pigment. Thus, the gas barrier layer has excellent gas barrier property under a high humidity atmosphere as compared with a gas barrier layer including a water-soluble polymer containing no pigment.

In the present invention, in the case where the gas barrier layer contains a pigment, the blending quantity of the pigment is preferably in the range of 1 part by weight or more and 1000 parts by weight or less in terms of dry weight based on 100 parts by weight of the water-soluble polymer.

In the present invention, when the pigment is blended into the water-soluble polymer, it is preferable to add and mix a pigment which is slurried.

In the present invention, a crosslinking agent typified by a polyvalent metal salt or the like can be added to the gas barrier layer. The crosslinking agent allows a crosslinking reaction with an aqueous resin contained in the gas barrier layer to occur, resulting in an increase in number of bonds (crosslinked points) in the gas barrier layer. In other words, the gas barrier layer can have a dense structure to thereby exhibit favorable gas barrier property.

In the present invention, the type of the crosslinking agent is not particularly limited, and a polyvalent metal salt (a compound obtained by bonding a multivalent metal such as copper, zinc, silver, iron, potassium, sodium, zirconium, aluminum, calcium, barium, magnesium or titanium and an ionic substance such as carbonate ion, sulfate ion, nitrate ion, phosphate ion, silicate ion, nitrogen oxide or boron oxide), an amine compound, an amide compound, an aldehyde compound, hydroxyl acid, and the like can be appropriately selected and used depending on the type of the water-soluble polymer contained in the gas barrier layer. Herein, the polyvalent metal salt is preferably used and potassium alum is more preferably used from the viewpoint of expression of the crosslinking effect.

The blending quantity of the crosslinking agent is not limited in any way as long as the mixing amount of the crosslinking agent allows the concentration and the viscosity of the coating color to fall within the ranges permitting coating operation, the blending quantity of the crosslinking agent to be used is preferably in the range of 0.1 parts by weight or more and 30 parts by weight or less, more preferably in the range of 1 part by weight or more and 15 parts by weight or less in terms of dry weight based on 100 parts by weight of the water-soluble polymer. A blending quantity of less than 0.1 parts by weight may cause the effect of addition of the crosslinking agent not to be sufficiently obtained in some cases. On the other hand, a blending quantity of more than 30 parts by weight may cause the viscosity of the coating color to be remarkably increased, thereby making coating difficult in some cases.

In the present invention, the gas barrier layer preferably contains a surfactant from the viewpoint of adhesion to the water vapor barrier layer. The ionicity of the surfactant is not restricted, and any of anionic surfactant, a cationic surfactant, an amphoteric surfactant and a nonionic surfactant can be used alone or in combinations of two or more kinds thereof. Further, specific examples of the surfactant can include a silicone-based surfactant, a fluorine-based surfactant, an alcohol-based surfactant, an acetylene-based surfactant having an acetylene group, an acetylenediol-based surfactant having an acetylene group and two hydroxyl groups, an alkylsulfonic acid-based surfactant having an alkyl group and sulfonic acid, an ester-based surfactant, an amide-based surfactant, an amine-based surfactant, an alkyl ether-based surfactant, a phenyl ether-based surfactant, a sulfate-based surfactant and a phenol-based surfactant. In particular, an acetylenediol-based surfactant high in the effect of enhancing leveling property of a coating color is preferably used. An enhancement in leveling property of a coating color results in an enhancement in uniformity of the gas barrier layer, and thus results in an enhancement in gas barrier property.

In the present invention, the surface tension of a coating color for the gas barrier layer is preferably adjusted to 10 mN/m or more and 60 mN/m or less, more preferably adjusted to 15 mN/m or more and 50 mN/m or less, from the viewpoint of adhesion to the water vapor barrier layer.

The surface tension of the coating color for the gas barrier layer is preferably ±20 mN/m relative to the wetting tension on the surface of the water vapor barrier layer, from the viewpoint of adhesion of the water vapor barrier layer and the gas barrier layer.

A coating color for the gas barrier layer preferably contains water as a main solvent.

In the present invention, various auxiliary agents commonly used, such as a dispersant, a thickening agent, a water-retention agent, an antifoaming agent, a water-resistant agent, a dye and a fluorescent dye, can be used, in addition to the above water-soluble polymer and pigment, in the gas barrier layer.

(Coating of Water Vapor Barrier Layer and Gas Barrier Layer)

In the present invention, the method for coating of the water vapor barrier layer and the gas barrier layer is not limited in any way, and such coating can be made by a known coating machine and coating system. Examples of such a coating machine include a blade coater, a bar coater, a roll coater, an airknife coater, a reverse roll coater, a curtain coater, a spray coater, a size press coater and a gate roll coater. Examples of such a coating system include an aqueous coating system where a solvent such as water is used and a solvent-based coating system where a solvent such as an organic solvent is used.

The method for drying the water vapor barrier layer and the gas barrier layer, which is here used, is, for example, a common method using a steam heating heater, a gas heater, an infrared heater, an electric heater, a hot air heating heater, a microwave, a cylinder dryer, or the like.

In the present invention, the coating weight of the water vapor barrier layer is preferably 3 $g/m^2$ or more and 50 $g/m^2$ or less, more preferably 5 $g/m^2$ or more and 40 $g/m^2$ or less, further preferably 7 $g/m^2$ or more and 30 $g/m^2$ or less in terms of dry weight. If the coating quantity of the water vapor barrier layer is smaller than 3 $g/m^2$, covering the paper substrate fully with the coating color may be difficult, thereby not allowing a sufficient water vapor barrier property to be obtained, and/or causing the gas barrier layer to permeate the paper substrate and thus not allowing sufficient gas barrier property to be obtained. On the other hand, a coating weight of more than 50 $g/m^2$ causes a drying load in coating to be increased.

In the present invention, the water vapor barrier layer may be configured from one layer or multiple layers including two or more layers. In the case where the water vapor barrier layer is configured from multiple layers including two or more layers, the total coating weight of all the water vapor barrier layers is preferably in the above range.

In the present invention, the coating weight of the gas barrier layer is preferably 0.2 $g/m^2$ or more and 20 $g/m^2$ or less in terms of dry weight. If the coating quantity of the gas barrier layer is smaller than 0.2 $g/m^2$, forming a uniform gas barrier layer may be difficult, thereby not allowing sufficient gas barrier property to be obtained. On the other hand, a coating weight of more than 20 $g/m^2$ causes a drying load in coating to be increased.

In the present invention, the gas barrier layer may be configured from one layer or multiple layers including two or more layers. In the case where the gas barrier layer is configured from multiple layers including two or more layers, the total coating weight of all the gas barrier layers is preferably in the above range.

(Resin Layer)

The barrier material of the present invention can have a resin layer on at least one surface of a base material. The resin layer can impart to the barrier material, further water vapor barrier property and gas barrier property, or oil resistance, solvent resistance, heat resistance, abrasion resistance, impact resistance, lightfastness, a heat-sealing property, and the like. In particular, in the case where the base material is paper barrier base paper, any effect of moisture in the air on (degradation of) the water vapor barrier layer and the gas barrier layer can be effectively prevented. The resin layer may be disposed on any side of surface of the base material including paper barrier base paper, and is preferably disposed on the side of the barrier layer.

Examples of the resin in the resin layer can include bio-derived resins such as polylactic acid (PLA), polyglycolic acid, esterified starch, cellulose acetate, polybutylene succinate (PBS), polybutylene succinate adipate (PBSA), polyester (PTT) of propanediol obtained by a fermentation method and fossil resource-derived terephthalic acid, soybean polyol, polyhydroxyalkanoate, biopolyethylene, bio-polyethylene terephthalate and biopolyurethane, and petroleum-derived resins such as polyester, polyvinyl alcohol, polypropylene, polyethylene, polystyrene, polyethylene terephthalate, polybutylene terephthalate, polymethylpentene, polyvinyl chloride, acrylonitrile-butadiene-styrene, acrylonitrile-styrene, polymethyl methacrylate, polyvinylidene chloride, polyamide (nylon), polyacetal and polycarbonate.

The bio-derived resin refers to a polymer material which includes an organic resource-derived substance renewable as a raw material, which is obtained by chemical or biological synthesis, and which has a number average molecular weight (Mn) of 1,000 or more.

Such an organic resource encompasses living plants and animals, harvested farm and marine products/forest products, organism remains, and the like, and specific examples thereof include the following.

Waste organic resources: food wastes, domestic animal wastes, building waste materials, used paper, and the like.

Unutilized organic resources: non-edible portions of agricultural crops, forest land-remaining materials, and the like.

Energy grain-based organic resources: plants to be cultivated for the purpose of energy sources or raw materials of products.

New crop-based organic resources: marine plants and genetically engineered plants suitable for organic resource production.

In the present invention, the resin in the resin layer is preferably a resin containing a biodegradable resin as a main component. The biodegradable resin refers to a resin having the property of being degraded to a molecule due to the action of microorganisms, and finally transformed into carbon dioxide and water and circulated in nature.

The phrase "containing a biodegradable resin as a main component" here means that 50% by weight or more of a biodegradable resin is contained.

In the present invention, the resin layer can be disposed by forming a coating layer and a resin laminate layer according to coating and a resin lamination method, respectively.

The thickness of the resin layer can be appropriately designed depending on the application, the type of a resin to be disposed on the base material, the type of a film, and the like in use for a bag or a soft packaging material described below, and is usually preferably 10 μm or more and 300 μm or less, more preferably 10 μm or more and 100 μm or less.

In the present invention, in the case where the resin layer is formed as a coating layer according to coating, a heat-sealing property can also be imparted to the barrier material by coating with an aqueous or solvent-based coating color containing a resin having a heat-sealing property. The resin layer can be formed as a coating layer by use of the resin having a heat-sealing property, to thereby allow the resulting barrier material to be favorable in defibering property as compared with a resin layer formed as a resin laminate layer, and thus can be easily recycled as used paper. Accordingly, the above case is preferable because the environment load can be reduced.

Any resin having biodegradability or not having biodegradability can be used as the resin having a heat-sealing property as deemed appropriately. Examples of such a resin include a polylactic acid (PLA) resin, a styrene-acrylate copolymerized resin, a polyolefin-based copolymerized product and an ethylene-methacrylic acid copolymerized product. Specific examples of the polylactic acid (PLA) resin include trade name: Rezem PLA-1 manufactured by Chukyo Yushi Co., Ltd. and trade name: Landy PL-1000 manufactured by Miyoshi Oil & Fat Co., Ltd., specific examples of the styrene-acrylate copolymerized resin include trade name: Harvill HS-1 manufactured by Daiichi Toryo Mfg., Ltd., specific examples of the polyolefin-based copolymerized product include trade name: Zaikusen AC manufactured by Sumitomo Seika Chemicals Co., Ltd., and specific examples of the ethylene-methacrylic acid copolymerized product include trade name: Chemipearl S100 manufactured by Mitsui Chemicals Inc., respectively.

The coating weight of the resin having a heat-sealing property can be appropriately adjusted depending on the required heat-sealing property, is not particularly limited, and is about 2 to 20 $g/m^2$ in terms of dry weight.

In the present invention, examples of the resin lamination method include an extrusion lamination method by melting the resin and extruding it onto the base material for lamination, and a dry lamination method and a sandwich lamination method each by pasting (film-pasting) a film on the base material with or without an adhesive being interposed. Examples of the resin laminate layer include an extrusion laminate layer, and a film attachment layer such as a barrier film and a deposition film.

In the case where the resin laminate layer is an extrusion laminate layer, any of various bio-derived resins or petroleum-derived resins described above is molten and layered as the resin laminate layer, on at least one surface of the base material including the paper barrier base paper, according to an extrusion lamination method. In the case where the resin laminate layer is a film attachment layer, a film made of any of various bio-derived resins or petroleum-derived resins described above is pasted on, as the resin laminate layer, at least one surface of the base material including the paper barrier base paper, according to a dry lamination method, a sandwich lamination method, or the like.

In the present invention, examples of the film for use in the film attachment layer include a film made of any of various bio-derived resins or petroleum-derived resins described above. Examples of the film made of such a petroleum-derived resin include barrier films, for example, a film containing a resin such as polyvinyl alcohol, an ethylene-vinyl alcohol copolymer, polyvinylidene chloride or polyacrylonitrile as a main component, a film obtained by coating the film made of any of various resins described above with such a resin such as polyvinyl alcohol, a film obtained by pasting metal foil made of any of various metals such as aluminum on the film made of any of various resins described above, and a deposition film obtained by depositing any of various metals such as aluminum or any inorganic oxide such as silicon oxide or aluminum oxide on the film made of any of various resins described above. Such films can be used alone or pasted together as multiple layers according to the purpose.

The barrier material of the present invention can be used as it is, or with being layered together with any of various resins or being pasted together with any of various general-purpose films, barrier films, aluminum foil, and the like, in a packaging material for foods or the like, a packaging material for use in a packaging application such as a bag, a paper container, a cardboard box or a cup, or a layered product for use in industrial materials or the like. In particular, the barrier material can be suitably used in a packaging material for foods or the like, or a packaging material for use in a packaging application such as a bag, a paper container, a cardboard box or a cup, and can be particularly suitably used in a soft packaging material for foods or the like. The soft packaging material has a configuration where a packaging material is formed by a material rich in flexibility, and generally refers to a packaging material which is made of a thin and flexible material such as paper, a film or aluminum foil alone, or pasted such a thin and flexible material together. The soft packaging material also refers to a packaging material which can keep a cubic shape by placing a content, for example, a bag.

In the case where the barrier material of the present invention is used in a packaging material for foods or the like, particularly in a soft packaging material, the barrier material can be layered together with the resin having a heat-sealing property, resulting in an increase in sealing property of a packaging material, protection of the content from, for example, oxidation due to oxygen and degradation due to moisture, and an extension in storage period.

The barrier material of the present invention can also be used in an industrial material such as wall paper, a building material, a paper tube or antirust paper. Even in the case where the barrier material is used in a layered product for use in an industrial material or the like, not only decay, degradation, and humidity can be prevented by suppressing penetration of oxygen and/or moisture, but also an effect such as flavor barrier property which prevents odor of a solvent from being leaked can be expected.

Furthermore, the barrier material of the present invention has a total degree of biomass of 50% or more, and thus can allow the environmental impact per square meter, in particular, the effect on global warming (amount of $CO_2$ emitted) to be substantially halved as compared with a synthetic resin film-based barrier material which has been heretofore widely used.

The environmental impact here mentioned is determined by quantitatively evaluating the respective environment loads (amounts of $CO_2$ emitted) at raw material production/procurement, papermaking/coating, lamination processing and disposal (incineration) stages of a life cycle, based on the life cycle assessment (LCA) procedure. The LCA is internationally standardized as ISO 14040/44, among international standards of environment management according to ISO (International Organization for Standardization).

The barrier material of the present invention has a total degree of biomass of 50% or more and thus generates carbon neutral $CO_2$ (not having any effect on global warming) as $CO_2$ derived from plants, generated in disposal (incineration), and thus is considered to enable the environmental impact per square meter, in particular, the effect on global warming to be substantially halved as compared with a synthetic resin film-based barrier material.

EXAMPLES

The present invention will be specifically described below with reference to Examples, but the present invention is, of course, not intended to be limited to such Examples. It should be noted, unless otherwise specified, "part(s)" and "%" in Examples refer to "part(s) by weight" and "% by weight", respectively. Each barrier material obtained was tested based on the evaluation methods described below.

(Evaluation Methods)
(1) Oxygen permeability (gas barrier property): measured in conditions of 23° C.—0% RH and in conditions of 23° C. -85% RH by use of OX-TRAN2/21 manufactured by MOCON, Inc.
(2) Water vapor permeability (water vapor barrier property): measured in conditions of a temperature of 40±0.5° C. and a relative humidity difference of 90±2% by use of a water vapor permeability tester (L80-4000, manufactured by Dr. Lyssy, Inc.) according to JIS K 7129: 2008 Plastics-Film and sheeting, Determination of water vapor transmission rate (Instrument method).
(3) Defibering Property
A barrier material cut into a 1-cm square piece was immersed in an aqueous 2% by weight sodium hydroxide solution at a liquid temperature of 60° C. so that the sample concentration was 2% by weight, and was subjected to a defibering treatment in a Tappi standard defibering machine for 60 minutes, and the degree of defibering in the aqueous solution was here evaluated.

[Evaluation Criteria]
○: a pulp fiber was dispersed and defibering property was favorable.
Δ: aggregation was observed on the resin layer, but a pulp fiber content was dispersed.
x: No change

Example 1

(Production of Paper Substrate) A raw material pulp was obtained by blending hardwood kraft pulp (LBKP) having a Canadian standard freeness (CSF) of 500 ml and softwood kraft pulp (NBKP) having a CSF of 530 ml at a weight ratio of 80/20.

To the raw material pulp were added polyacrylamide (PAM) having a molecular weight of 2500000 as a dry paper strengthening agent at a rate of 0.1% based on the bone-dry weight of the pulp, an alkyl ketene dimer (AKD) as a sizing agent at a rate of 0.35% based on the bone-dry weight of the pulp, a polyamide epichlorohydrin (PAEH)-based resin as a wet paper strengthening agent at a rate of 0.15% based on the bone-dry weight of the pulp, and furthermore polyacrylamide (PAM) having a molecular weight of 10000000 as a yield improver at a rate of 0.08% based on the bone-dry weight of the pulp, and thereafter the resultant was subjected to papermaking by a fourdrinier former, thereby providing a paper substrate having a grammage of 50 g/m$^2$.

(Preparation of Coating Color 1 for Water Vapor Barrier Layer)
Sodium polyacrylate (0.2% relative to a pigment) was added as a dispersant to engineered kaolin (Barrisurf HX manufactured by Imerys Minerals Ltd., average particle size: 9.0 μm, aspect ratio: 80-100), and the resultant was dispersed by a Serie mixer to prepare a kaolin slurry having a solid content concentration of 55%. A styrene-butadiene-based latex (PNT7868 manufactured by Zeon Corporation) was blended as a water vapor barriering resin in an amount of 100 parts (solid content) based on 100 parts (solid content) of the pigment, into the resulting kaolin slurry, thereby providing coating color 1 for a water vapor barrier layer, having a solid content concentration of 50%.

(Preparation of Coating Color 1 for Gas Barrier Layer)
Sodium polyacrylate (0.2% relative to a pigment) was added as a dispersant to engineered kaolin (Barrisurf HX manufactured by Imerys Minerals Ltd., average particle size: 9.0 μm, aspect ratio: 80-100), and the resultant was dispersed by a Serie mixer to prepare a kaolin slurry having a solid content concentration of 55%. Polyvinyl alcohol (PVA117 manufactured by Kuraray Co., Ltd.) was prepared so as to have a solid content concentration of 10%, thereby providing an aqueous PVA solution. The resulting kaolin slurry and aqueous PVA solution were mixed so that the solid content concentration was 10% at a solid content ratio of pigment:aqueous PVA solution=100:100, thereby providing coating color 1 for a gas barrier layer.

(Production of Paper Barrier Base Paper and Barrier Material)
After one surface of the obtained paper substrate was coated with coating color 1 for a water vapor barrier layer by use of a blade coater so that the coating weight in terms of dry weight was 12 g/m$^2$, and was dried, the surface of the same side was coated with coating color 1 for a gas barrier layer by use of a roll coater so that the coating weight in terms of dry weight was 3.0 g/m$^2$, and was dried, thereby providing paper barrier base paper 1. The biodegradability (JIS K6955:2006) of paper barrier base paper 1 obtained was 90% after 90 days from the start of the test.

Furthermore, a polylactic acid (PLA) resin was layered on the gas barrier layer of paper barrier base paper 1 obtained, at a thickness of 20 μm (25.2 g/m2) according to an extrusion lamination method, thereby providing a barrier material. The bio-derived raw materials of the barrier material were pulp and a polylactic acid resin, and the barrier material had a degree of biomass of 83.4%.

Example 2

The same manner as in Example 1 was performed except that the surface of the gas barrier layer of paper barrier base paper 1 obtained was coated with a polylactic acid (PLA) resin (trade name: Landy PL-1000 manufactured by Miyoshi Oil & Fat Co., Ltd.) so that the coating weight in terms of dry weight was 10.0 g/m$^2$, thereby providing a barrier material. The bio-derived raw materials of the barrier material were pulp and a polylactic acid resin, and the barrier material had a degree of biomass of 80.0%.

Example 3

A biomass polyethylene resin (trade name: Green Polyethylene manufactured by Braskem S.A.) was layered on the gas barrier layer of paper barrier base paper 1 obtained, at a thickness of 20 μm (25.2 g/m$^2$) according to an extrusion lamination method, thereby providing a barrier material. The bio-derived raw materials of the barrier material were pulp and a biomass polyethylene resin, and the barrier material had a degree of biomass of 83.4%.

Example 4

(Preparation of Coating Color 2 for Water Vapor Barrier Layer)

Sodium polyacrylate (0.2% relative to a pigment) was added as a dispersant to engineered kaolin (Barrisurf HX manufactured by Imerys Minerals Ltd., average particle size: 9.0 μm, aspect ratio: 80-100), and the resultant was dispersed by a Serie mixer to prepare a kaolin slurry having a solid content concentration of 60%. Into the resulting kaolin slurry were blended 100 parts (solid content) of a styrene-acrylic copolymer emulsion (X-511-374E manufactured by Saiden Chemical Industry Co., Ltd.) and 100 parts (solid content) of a paraffin-based water repellent (MYE-35G manufactured by Maruyoshi Chemical Co., Ltd., wax-containing polyethylene emulsion) as water vapor barriering resins, based on 100 parts (solid content) of the pigment, thereby providing coating color 2 for a water vapor barrier layer, having a solid content concentration of 45%.

(Preparation of Coating Color 2 for Gas Barrier Layer)

Sodium polyacrylate (0.2% relative to a pigment) was added as a dispersant to engineered kaolin (Barrisurf HX manufactured by Imerys Minerals Ltd., average particle size: 9.0 μm, aspect ratio: 80-100), and the resultant was dispersed by a Serie mixer to prepare a kaolin slurry having a solid content concentration of 60%. Separately, aqueous polyvinyl alcohol solution (PVA117 manufactured by Kuraray Co., Ltd.) was prepared so as to have a solid content concentration of 10%. Into the resulting aqueous polyvinyl alcohol solution were blended 145 parts (solid content) of a kaolin slurry and 1 part (solid content) of a silicone-based surfactant (SN Wet 125 manufactured by San Nopco Limited) based on 100 parts (solid content) of the polyvinyl alcohol, thereby providing coating color 2 for a gas barrier layer.

(Production of Paper Barrier Base Paper and Barrier Material)

After one surface of the paper substrate obtained in Example 1 was coated with coating color 2 for a water vapor barrier layer so that the coating weight in terms of dry weight was 15 g/m$^2$, and was dried, the surface of the same side was coated with coating color 2 for a gas barrier layer so that the coating weight in terms of dry weight was 5.0 g/m$^2$, thereby providing paper barrier base paper 2. The biodegradability (JIS K6955:2006) of paper barrier base paper 2 obtained was 90% after 90 days from the start of the test.

Furthermore, a polylactic acid (PLA) resin was layered on the gas barrier layer of paper barrier base paper 2 obtained, at a thickness of 20 μm (25.2 g/m$^2$) according to an extrusion lamination method, thereby providing a barrier material. The bio-derived raw materials of the barrier material were pulp and a polylactic acid resin, and the barrier material had a degree of biomass of 79.0%.

Example 5

The same manner as in Example 4 was performed except that the surface of the gas barrier layer of paper barrier base paper 2 obtained was coated with a polylactic acid (PLA) resin (trade name: Landy PL-1000 manufactured by Miyoshi Oil & Fat Co., Ltd.) so that the coating weight in terms of dry weight was 10.0 g/m$^2$, thereby providing a barrier material. The bio-derived raw materials of the barrier material were pulp and a polylactic acid resin, and the barrier material had a degree of biomass of 75.0%.

Example 6

The same manner as in Example 4 was performed except that the surface of the gas barrier layer of paper barrier base paper 2 obtained was coated with an acrylate copolymerized resin (trade name: Harvill HS-1 manufactured by Daiichi Toryo Mfg., Ltd.) so that the coating weight in terms of dry weight was 10.0 g/m$^2$, thereby providing a barrier material. The bio-derived raw material of the barrier material was pulp, and the barrier material had a degree of biomass of 62.5%.

Example 7

A biomass polyethylene resin (trade name: Green Polyethylene manufactured by Braskem S.A.) was layered on the gas barrier layer of paper barrier base paper 2 obtained, at a thickness of 20 μm (25.2 g/m$^2$) according to an extrusion lamination method, thereby providing a barrier material. The bio-derived raw materials of the barrier material were pulp and a biomass polyethylene resin, and the barrier material had a degree of biomass of 79.0%.

Example 8

(Preparation of Coating Color 3 for Water Vapor Barrier Layer)

Into a mica slurry (product name: NTS-10 manufactured by Topy Industries Limited, aspect ratio: 1500, solid content concentration: 10%) were blended 100 parts (solid content) of a styrene-acrylic copolymer emulsion (X-511-374E manufactured by Saiden Chemical Industry Co., Ltd.) and 100 parts (solid content) of a paraffin-based water repellent (MYE-35G manufactured by Maruyoshi Chemical Co., Ltd., wax-containing polyethylene emulsion) as water vapor barriering resins based on 100 parts (solid content) of the pigment, thereby providing coating color 3 for a water vapor barrier layer, having a solid content concentration of 32%.

(Preparation of Coating Color 3 for Gas Barrier Layer)

A mica slurry (product name: NTS-10 manufactured by Topy Industries Limited, aspect ratio: 1500, solid content concentration: 10%) was prepared. Separately, aqueous polyvinyl alcohol liquid (PVA117 manufactured by Kuraray Co., Ltd.) was prepared so as to have a solid content concentration of 10%. Into the resulting aqueous polyvinyl alcohol solution were blended 30 parts (solid content) of a mica slurry and 1 part (solid content) of a silicone-based surfactant (SN Wet 125 manufactured by San Nopco Limited) based on 100 parts (solid content) of the polyvinyl alcohol, thereby providing coating color 3 for a gas barrier layer.

(Production of Paper Barrier Base Paper and Barrier Material)

After one surface of the paper substrate obtained in Example 1 was coated with coating color 3 for a water vapor barrier layer so that the coating weight in terms of dry weight was 15 g/m², and was dried, the surface of the same side was coated with coating color 3 for a gas barrier layer so that the coating weight in terms of dry weight was 5.0 g/m², thereby providing paper barrier base paper 3. The biodegradability (JIS K6955:2006) of paper barrier base paper 3 obtained was 90% after 90 days from the start of the test.

Furthermore, a polylactic acid (PLA) resin was layered on the gas barrier layer of paper barrier base paper 3 obtained, at a thickness of 20 μm (25.2 g/m²) according to an extrusion lamination method, thereby providing a barrier material. The bio-derived raw materials of the barrier material were pulp and a polylactic acid resin, and the barrier material had a degree of biomass of 79.0%.

Comparative Example 1

A biaxially oriented polypropylene film having a thickness of 20 μm was pasted onto one surface of an EVOH film having a thickness of 12 μm according to a dry lamination method, and a linear low-density polyethylene film having a thickness of 25 μm was pasted onto the other surface according to a dry lamination method, respectively, thereby providing a barrier material.

TABLE 1

| | | Oxygen permeability | | Water | |
|---|---|---|---|---|---|
| | Degree of biomass % | Under drying ml/m²·day·atm | Under high humidity ml/m²·day·atm | vapor permeability g/m²·day | Defibering Property |
| Example 1 | 83.4 | 1.1 | 50.0 | 80.0 | Δ |
| Example 2 | 80.0 | 1.1 | 50.0 | 100.0 | ○ |
| Example 3 | 83.4 | 1.1 | 25.0 | 20.0 | Δ |
| Example 4 | 79.0 | 1.1 | 3.0 | 20.0 | Δ |
| Example 5 | 75.0 | 1.1 | 3.0 | 30.0 | ○ |
| Example 6 | 62.5 | 1.1 | 3.0 | 30.0 | ○ |
| Example 7 | 79.0 | 1.1 | 3.0 | 10.0 | Δ |
| Example 8 | 79.0 | 1.0 | 2.7 | 10.0 | Δ |
| Comparative Example 1 | 0 | 1.0 | 1.5 | 4.8 | X |

The invention claimed is:

1. A barrier material comprising:
   a paper base material which is a laminate constituted by a paper substrate, a water vapor barrier layer, and a gas barrier layer stacked in this order, wherein the gas barrier layer is comprised of a water-soluble polymer and a surfactant; and
   a resin layer formed on the paper base material on a side of the gas barrier layer,
   wherein the barrier material has an oxygen permeability of 10 ml/m²·day·atm or less at a temperature of 23° C. and a relative humidity of 0%, and has a total degree of biomass of 50% or more.

2. The barrier material according to claim 1, wherein the resin layer comprises a biodegradable resin as a main component.

3. The barrier material according to claim 2, wherein the biodegradable resin is polylactic acid or polybutylene succinate.

4. The barrier material according to claim 1, wherein the resin layer comprises a bio-derived resin as a main component.

5. The barrier material according to claim 1, wherein the resin layer is a coating layer on the paper base material.

6. The barrier material according to claim 1, wherein the barrier material comprises mica.

7. The barrier material according to claim 1, having a water vapor permeability of 100 g/m²·day or less at a temperature of 40±0.5° C. and a relative humidity difference of 90±2%.

8. The barrier material according to claim 1, having a water vapor permeability of 10 g/m²·day or less at a temperature of 40±0.5° C. and a relative humidity difference of 90±2%.

9. The barrier material according to claim 1, meeting the conditions in (1) to (3) below:
   (1) a water vapor permeability of 3.5 g/m²·day or less at a temperature of 40±0.5° C. and a relative humidity difference humidity of 90±2%,
   (2) an oxygen permeability of 3 ml/m²·day·atm or less at a temperature of 23° C. and a relative humidity of 0%, and
   (3) an oxygen permeability of 3 ml/m²·day·atm or less at a temperature of 23° C. and a relative humidity of 85%.

10. The barrier material according to claim 1, wherein the water vapor barrier layer comprises a water vapor barriering resin and a water repellent.

11. The barrier material according to claim 1, wherein the water vapor barrier layer comprises a water vapor barriering resin and a water repellent, and the gas barrier layer comprises a water-soluble polymer and a surfactant.

12. The barrier material according to claim 1, wherein the paper base material has a grammage of 30 g/m² or more and 150 g/m² or less.

13. A packaging material using the barrier material according to claim 1.

14. A bag using the barrier material according to claim 1.

15. A paper container using the barrier material according to claim 1.

16. A cardboard box using the barrier material according to claim 1.

17. A cup using the barrier material according to claim 1.

18. A soft packaging material which is a flexible material constituted by the barrier material according to claim 12.

* * * * *